United States Patent [19]

Palencher

[11] 3,896,640

[45] July 29, 1975

[54] DEVICE FOR THE DETECTION OF EXCESSIVE THREAD TENSION AND THREAD BREAKAGE

[75] Inventor: Jacques Palencher, Troyes, France

[73] Assignee: Lebocey Industrie, Troyes, France

[22] Filed: Apr. 9, 1973

[21] Appl. No.: 349,014

[52] U.S. Cl. .................................. 66/161; 242/36
[51] Int. Cl. ..................... D04b 35/12; D04b 35/14
[58] Field of Search ............ 66/158, 159, 160, 161, 66/162, 163, 164; 19/.25, .26; 28/50, 51, 53; 57/80, 81; 87/18, 19; 242/29, 37 R, 242/49, 36; 266/11

[56] References Cited
UNITED STATES PATENTS

| 719,728 | 2/1903 | Bockmeyer et al. .................. 66/161 |
| 1,609,305 | 12/1926 | Perron ................................... 87/19 |
| 2,430,633 | 11/1947 | Fogleman et al. ..................... 66/158 |
| 2,467,952 | 4/1949 | Antonevich............................ 66/163 |
| 3,388,565 | 6/1968 | Mishcon ............................... 66/161 |
| 3,481,550 | 12/1969 | Chavis................................ 242/37 R |
| 3,482,420 | 12/1969 | Bourgeois ............................ 66/158 |
| 3,707,854 | 1/1973 | Matzel ............................. 66/125 R |

FOREIGN PATENTS OR APPLICATIONS

| 227,013 | 1/1925 | United Kingdom.................. 242/29 |
| 838,908 | 6/1960 | United Kingdom.................. 19/165 |

Primary Examiner—W. C. Reynolds
Assistant Examiner—A. M. Falik
Attorney, Agent, or Firm—Spensley, Horn and Lubitz

[57] ABSTRACT

A device for detecting the breakage of, and excessive tension in, the thread operating in knitting machinery, the device comprising a case, a first detection lever for detecting breakage of the thread, and a second detection lever for detecting excessive thread tension, both detection levers being pivotally mounted to the case. The second detection lever cooperates with a return spring attached at one end thereof to the lever and at the other end thereof to the case. The location of the points at which the spring is attached to the second detection lever and case respectively are such that the spring provides a force which resists the pivoted movement of the detection lever, such force varying by a small but uniform amount with the angle defined by the lever. The thread is applied to and supported by the second detection means. When the thread is subjected to excessive tension, the second detection lever pivots against the resisting force of the spring until it reaches an angle at which the thread escapes. The detection lever and return spring configuration is such that after the thread escapes, the return spring forces the lever back to its original position, without any need to reset it.

2 Claims, 5 Drawing Figures

DEVICE FOR THE DETECTION OF EXCESSIVE THREAD TENSION AND THREAD BREAKAGE

BACKGROUND OF THE INVENTION

1. Field of the Invention

This invention relates to knitting machinery and more particularly to a device which detects over-tension and/or breakage in thread.

2. Prior Art

Devices for detecting excessive tension and breakage of threads in textile machinery are known in the prior art. Typically, these devices of the prior art are comprised of two detection levers pivotally mounted on a case, the first detection lever being arranged and configured to detect the breakage of thread, while the second lever is arranged and configured to detect excessive tension in the thread. In these known devices, the first detection lever includes a counterweight which, if and when the thread breaks, causes a pivoting thereof to occur. Such pivoting provides the indication of thread breakage. The second detection lever typically includes a coil or spiral spring which resiliently maintains it in a proper position to hold the thread so long as the tension on the thread is not excessive. However, when the tension on the thread becomes excessive, the second detection lever pivots to an angular position which enables the thread to escape therefrom before breaking.

The devices of the prior art have several significant limitations and shortcomings which the present invention overcomes. For one thing, in most of the known devices, the tension of the spring used in connection with the lever for detecting excessive thread tension increases too rapidly as the detection lever pivots, so that very often, the thread breaks before the lever assumes the angular position which would enable the thread to escape. When this occurs, the operator must join together the ends of the broken thread and restart the machine, causing a delay in operation. The present invention substantially precludes the breakage of thread, even relatively thin thread, due to the rapid increase of spring tension as the second detection lever pivots.

A second shortcoming of some of the devices of the prior art results from the manner in which the spring is connected to the lever for detecting excessive thread tension. Often, this spring is placed in such a position that the detector lever, if it passes beyond a certain balance point in the course of its pivoting movement, tilts suddenly to a fully open position in which it is maintained by the tension of the spring. For this reason, when over-tension in the thread is detected and the thread escapes, it is necessary, before restarting the machine, to reset the detection lever to its closed position, in addition to the usual replacement of the thread. However, the resetting of the detection lever is often difficult to carry out inasmuch as it is typically located at a relatively great height on the knitting machine. Thus, its resetting requires the use of manually manipulated long pole or stick (in addition to the pole or stick required to replace the thread). The requirement for an additional pole or stick to reset the detection lever, or the need for a specific pole or stick adapted to enable both the replacement of the thread and the resetting of the detection lever is a significant disadvantage of these known devices. Moreover, the requirement to reset the detection lever causes a further delay in the restarting of machine operation.

BRIEF SUMMARY OF THE INVENTION

The present invention is an improvement in knitting machines. It is a device comprising a case and two detection levers pivotally mounted thereto, the first detection lever for detecting a breakage in thread and the second for (i) holding the thread, (ii) detecting excessive tension thereof and (iii) allowing the thread to escape when excessive tension is detected. The second detection lever is connected to one end of a return spring, the second end of the spring being connected to the case. The return spring provides a force which pulls the second detection lever against an abutment. It is a novel feature of this invention that the end points of the spring are on opposite sides of an imaginary straight line joining the axis of rotation of the second detection lever and the point at which the thread is applied to the second detection lever. It is a further feature of this invention that the spring is affixed at one of its ends to the case at a point located nearer to the axis of rotation of the second detection lever than to the point at which the thread is applied thereto, and that the spring is fixed at its other end to the second detection lever at a point nearer to the point at which the thread is applied thereto than to the axis rotation of said detection lever.

Still another feature of the present invention is that the longitudinal axis of the spring forms an angle of less than 45° with the imaginary straight line between the axis of rotation of the second detection lever and the point at which the thread is applied thereto. Further, the length of the spring is substantially the same as the length of the above-described imaginary straight line.

Thus, it is a principle object of the present invention to provide a device for detecting thread breakage and excessive thread tension with great sensitivity and without introducing the risk of itself causing the breakage of the controlled thread, even very thin thread.

Another object of this invention is to provide a thread breakage and over-tension detection means which is simple to use and which does not require any additional resetting operation in order to place a thread thereon.

Still another object of this invention is to provide a detection lever for detecting excessive tension in thread, arranged and configured so that a spring force which resists its pivotal movement varies by a small but uniform amount with the angle defined by the lever.

One advantage of the present invention, attributable to the aforesaid features and objects, is that it reduces the friction of the thread on the second detection lever and also the risk of the shag of the thread forming knots and accumulating where the thread is supported by said lever.

BRIEF DESCRIPTION OF THE DRAWINGS

One embodiment of the present invention is illustrated in the accompanying drawings, it being understood that the invention is not limited to the particular features therein shown.

DETAILED DESCRIPTION OF THE INVENTION

Figure 1:
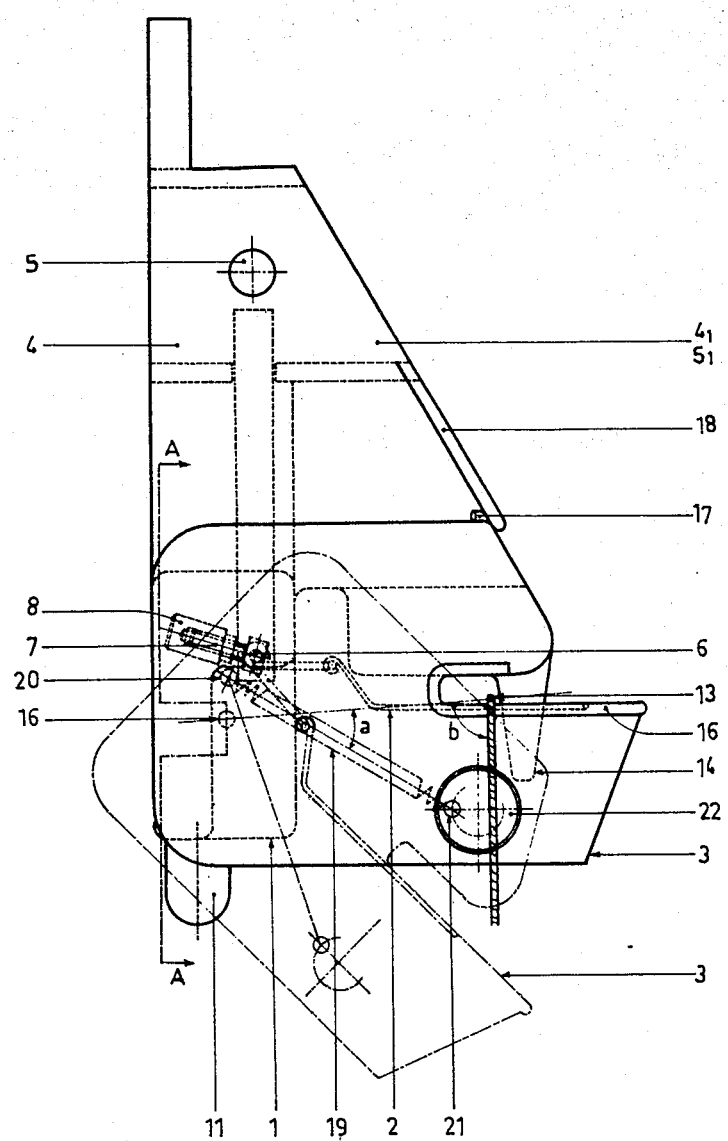
FIG. 1 is a side view of an embodiment of the present invention.

The present invention comprises, in general, a case 1, a first detection lever 2 for detecting the breakage of a thread 13, and a second detection lever 3 for detecting excessive tension in the thread 13.

In addition, affixed to the case 1 are a plate 4 and an intermediate plate 5. Plate 4 enables the invented device to be secured to an adequate supporting means on the knitting machine at locating hole $4_2$. Plates 4 and 5 form, with their leading edges, $4_1$ and $5_1$ respectively, an inclined ramp to enable the thread 13 to be introduced into the detection lever 3.

The detection lever 2 for detecting thread breakage is fixed to a first spindle 6 mounted pivotally on the case 1. Spindle 6 is integral with a threaded extension 7 onto which a head 8 is screwed adjustably so as to form a counterweight for detection lever 2.

Figure 4:
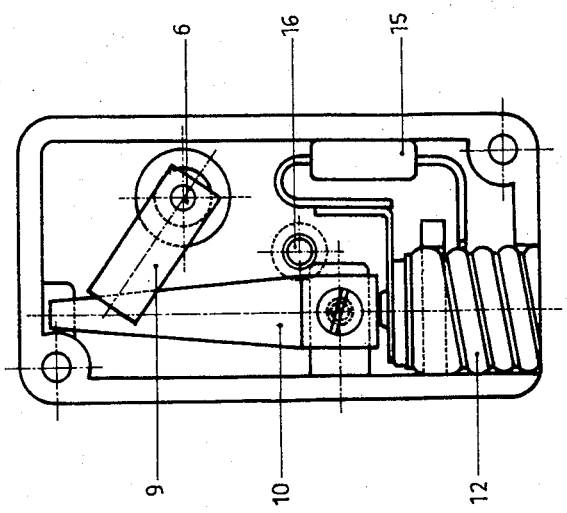
FIG. 4 is a broken away side view into the case of the device shown in FIG. 1.
Figure 3:
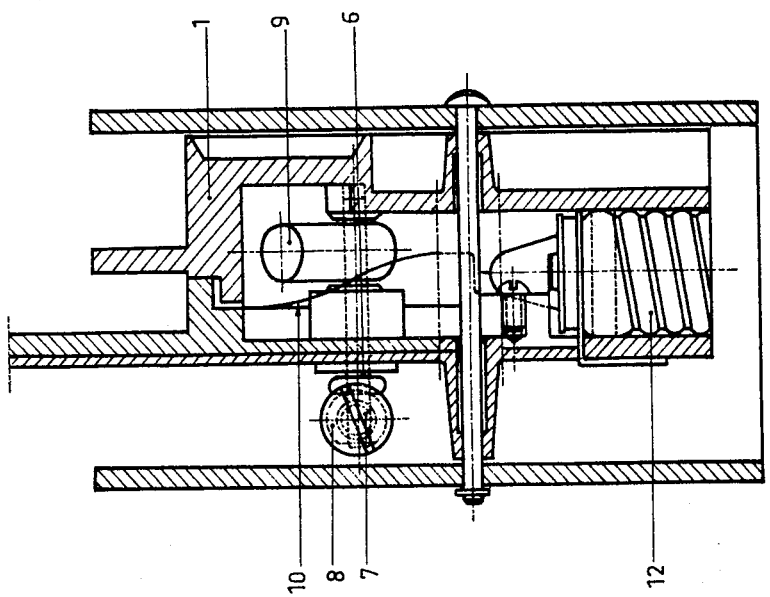
FIG. 3 is a cross-sectional view taken along lines A — A, of the device shown in FIG. 1.

Inside the case 1, a metal stud 9 is fixed on the spindle 6. During the pivoting motion of the detection lever 2, stud 9 can come into contact with a resilient metal blade 10, likewise located within the case 1. The stud 9 and the blade 10 serve as contact points in a simple electric circuit, connecting a source of electrical energy to a socket 12 containing a bulb 11. When the thread to be controlled 13 is placed on the second detection lever 3, beyond the edges 14 of the plates 4 and 5, the thread 13 maintains the first detection lever 2 in position. However, if thread 13 should break, the counterweight 8 causes the detection lever 2 to pivot about spindle 6, thereby causing the stud 9 to contact the metal blade 10 and the bulb 11 to be supplied with electrical current. The turning on of the bulb 11 provides a visual signal indicating that there is a failure in the thread feed of the machine. Moreover, as seen in FIG. 4, a resistor 15 is placed in parallel with the bulb 11, causing the machine to stop when the thread 13 breaks, even if the bulb is damaged.

Figure 2:
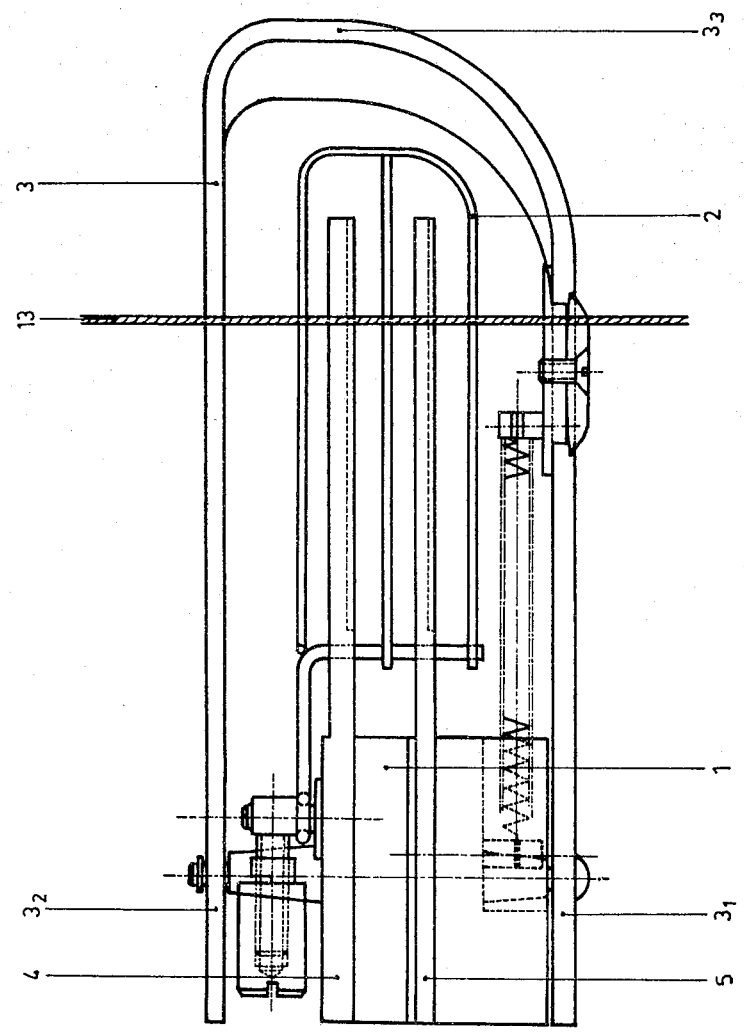
FIG. 2 is a plan view of the device shown in FIG. 1.
Figure 5:
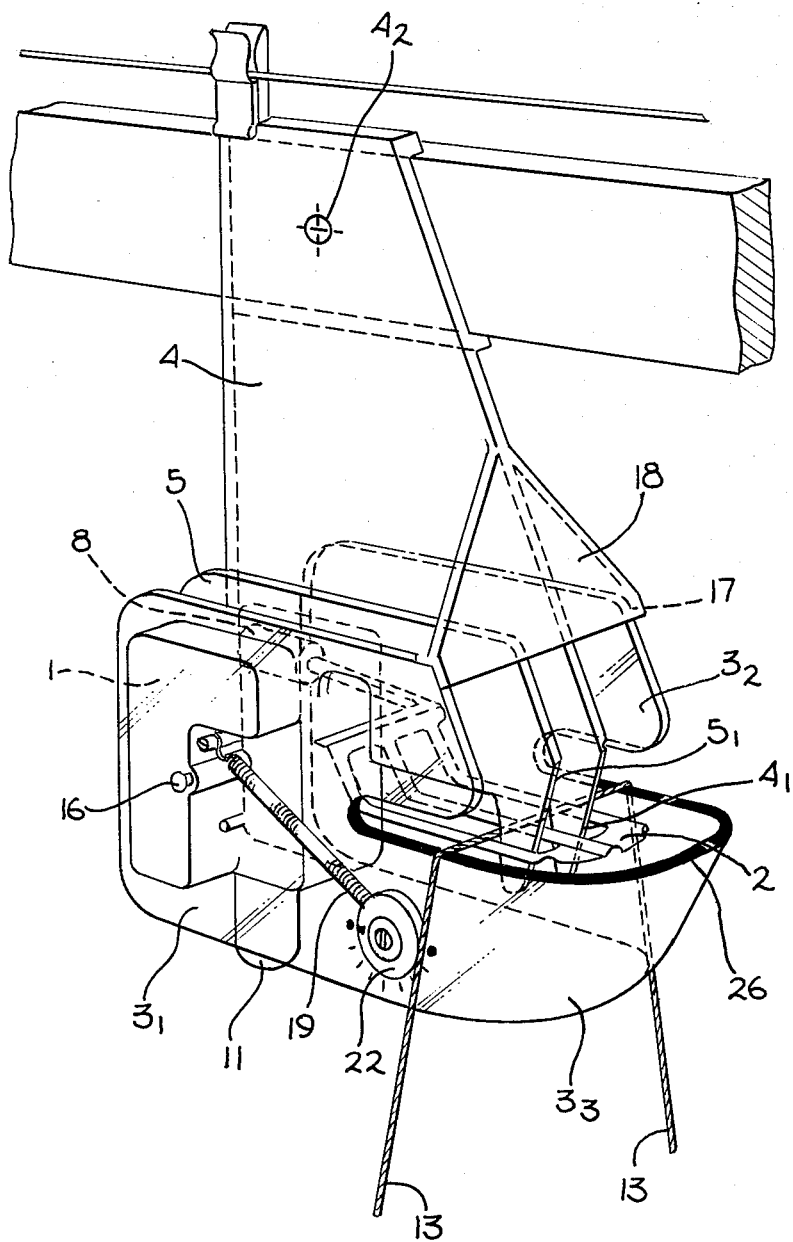
FIG. 5 is a front perspective view of the device shown in FIG. 1.

On the case 1, the second detection lever 3 is also pivotally mounted by means of a spindle 16. Detection lever 3, which detects over-tension in the thread 13, is comprised of a plate, preferably of plastic material, formed in the general shape of a U, as shown particularly in FIGS. 2 and 5. Detection lever 3 is mounted pivotally on the spindle 16 close to the ends $3_1$ and $3_2$ of the arms of the U. The curved portion $3_3$ of the U shaped plate forms, together with the arms thereof, a protective housing which prevents the accumulation of shag from the thread 13. The thread 13 is supported on the upper edge of the plate in a hollow provided for that purpose, as shown in FIG. 1. In addition, on the upper edge of the plate forming the second detection lever 3, and more particularly, in the hollow in which thread 13 comes to bear, a metal retaining ring 26 is provided in order to facilitate the sliding movement of the thread 13 and thereby avoid the build-up of shag around this ring. The ring 26 is affixed to the edge of the U-shaped plate by gluing. It should be noted, in addition, that according to this invention, the pivoting spindle 16 is substantially co-planar with the edge of the hollow on which ring 26 is affixed, as seen most clearly in FIG. 5.

The second detection lever 3 is normally maintained against an abutment 17 by the force of a spring 19. Abutment 17 is disposed under the edge of a member 18 which is affixed to plate 4 and generally perpendicular thereto. The spring 19 is secured to the case at one of its ends by means of a stud 20 and to the detection lever 3 at its other end by means of a second stud 21. Stud 21 is placed off center on a knob 22 which is rotatably mounted on the plate comprising detection lever 3. Consequently, rotation of the knob 22 in one direction or the other enables the length of the spring 19 to be adjusted and, thereby, also the return force which it exerts on detection lever 3.

The location of stud 20, i.e., the point of attachment of one end of spring 19 to case 1, is above the imaginary line 16 – 13 joining the spindle 16 to the thread 13, when the latter is in place in detection lever 3. On the other hand, the location of stud 21, i.e., the point of attachment of the other end of spring 19 to the detection lever 3 is below line 16 – 13. In addition, as is seen in FIG. 1, the location of stud 20 is situated closer to the pivoting spindle 16 of the detection lever 3 than to the point at which the thread 13 is applied thereto, while, in contrast, the location of stud 21 is situated closer to the point at which the thread 13 is applied to the detection lever 3 than to the pivoting spindle 16 thereof.

In addition, according to the invention, the length of the spring 19 is substantially equal to the distance between the spindle 16 and the point at which the thread 13 is applied to the detection lever 3. Because this distance is relatively great, it is possible, by means of knob 22, to adjust the tension of the spring accurately so that the detection lever 3 will resist what is considered to be normal tension in the thread 13 and begin to pivot when the tension exceeds this normal level. Moreover, because of the manner in which the ends of the spring 19 are attached to the case 1 and the detection level 3, and because of the great length of the spring, there is substantially no vibration of the detection lever 3. Such vibration would be detrimental to the effective control of the feed thread of a knitting machine.

In addition, according to this invention, in order to increase the precision with which excessive tension in a thread 13 is detected, the longitudinal axis of the spring 19 forms, with the imaginary straight line 16 – 13 passing through the spindle 16 and the point at which the thread 13 is applied to the detection lever 3, an angle $a$. By virtue of the fact that spring 19 is attached at one end thereof near the spindle 16 and at its other end near the point at which the thread 13 is applied to the detection lever 3, the angle $a$ remains less than 45°. Thus, only a relatively small component of the pulling force of spring 19 is in a direction which tends to force the detection lever 3 to its high position against the abutment 17 (i.e., sine $a$). Moreover, because of its length and position, the spring 19 is stretched only slightly when the detection lever 3 is driven pivotally, thereby producing only a slight increase in the spring's pulling force. By virtue of this construction, as the detection lever 3 due to excess tension of the thread 13, only a relatively small small component of the slightly increasing pulling force of spring 19 is applied as a return or counter force. Furthermore, inasmuch as the angle $a$ is less than 45°, the component of the pulling force is relatively uniform or linear. Thus, as the detection lever 3 pivots, a uniformly and gradually increasing return force is applied thereto, tending to restore it to its high position.

It should also be pointed out that the pivoting spindle 16 of the detection lever 3 is placed in a way such that the imaginary straight line 16 - 13 forms, with the plane in which the thread 13 is included, an angle *b* having a maximum value of 90°. Thus, when the detection lever 3 begins to pivot due to the force attributable to over tension in the thread 13, the component of the force of the thread in a direction tending to force the detection lever 3 downward decreases constantly. This is because said component of the thread tension is a function of sine *b* and the angle *b* decreases from a maximum of approximately 90° as the detection lever 3 pivots.

In operation, when the detection lever 3 assumes a sufficiently sharp angle (see broken lines in FIG. 1), the thread 13 slides on the retaining ring 26 and escapes therefrom; the detection lever 3 then rises again to its initial position against abutment 17 as a result of the force exerted by the return spring 19. In addition, once the thread 13 has escaped from detection lever 3, detection lever 2 also is freed. It then tilts due to the action of its counterweight 8, resulting in electrical contact being made between stud 9 and metal blade 10 and, consequently, in the lighting up of bulb 11 and the stopping of the machine.

It is obvious that the invention is not limited to the examples of its embodiment herein above described and illustrated. If necessary, other forms and methods of embodiment can be envisaged without departing from the scope of the invention.

What is claimed is:

1. A device for detecting the breakage of, and excessive tension in, the thread operating in a knitting machine comprising:
   a. a case;
   b. a first detection lever pivotally mounted to said case, said first detection lever being arranged and configured to detect the breakage of said thread;
   c. a second detection lever pivotally mounted to said case, said second detection lever being arranged and configured to slidably support said thread; and
   d. a spring means having first and second ends, said first end thereof being connected to said case at a first point and said second end thereof being connected to said second detection lever at a second point thereon, the return force of said spring tending to maintain said second detection lever against an abutment, said first and second points being situated on opposite sides of an imaginary straight line joining the axis of rotation of said second detection lever and the point at which said thread engages said second detection lever, said first point being situated nearer to the axis of rotation of said second detection lever than to said point at which said thread engages said second detection lever, and said second point being situated nearer to said point at which said thread engages said second detection lever than to the axis of rotation of said second lever, the length of said spring being approximately equal to the distance between the axis of rotation of said second detection lever and said point at which said thread engages said second detection lever, whereby, said second detection lever is responsive to excessive tension in said thread by pivoting about its axis of rotation and against the return force of said spring until said thread escapes therefrom.

2. A device for detecting the breakage of, and excessive tension in, the thread operating in a knitting machine comprising:
   a. a case;
   b. a first detection lever pivotally mounted to said case, said first detection lever being arranged and configured to detect the breakage of said thread;
   c. a second detection lever pivotally mounted to said case, said second detection lever being arranged and configured to slidably support said thread, the axis of rotation of said second detection lever being substantially co-planar with the edge of said second detection lever on which said thread is slidably supported; and
   d. a spring means having first and second ends, said first end thereof being connected to said case at a first point and said second end thereof being connected to said second detection lever at a second point thereon, the return force of said spring tending to maintain said second detection lever against an abutment, said first and second points being situated on opposite sides of an imaginary straight line joining the axis of rotation of said second detection lever and the point at which said thread engages said second detection lever, said first point being situated nearer to the axis of rotation of said second detection lever than to said point at which said thread engages said second detection lever, and said second point being situated nearer to said point at which said thread engages said second detection lever than to the axis of rotation of said second detection lever, whereby, said detection lever is responsive to excessive tension in said thread by pivoting about its axis of rotation and against the return force of said spring until said thread escapes therefrom.

* * * * *